US007860101B2

(12) United States Patent
Kekki

(10) Patent No.: US 7,860,101 B2
(45) Date of Patent: Dec. 28, 2010

(54) END-TO END CONNECTIONS IN A SWITCHED NETWORK

(75) Inventor: Sami J. Kekki, Helsinki (FI)

(73) Assignee: Nokia Corporation, Espoo (FI)

( * ) Notice: Subject to any disclaimer, the term of this patent is extended or adjusted under 35 U.S.C. 154(b) by 1269 days.

(21) Appl. No.: 11/236,791

(22) Filed: Sep. 28, 2005

(65) Prior Publication Data

US 2006/0291382 A1 Dec. 28, 2006

(30) Foreign Application Priority Data

Jun. 28, 2005 (EP) .................................. 05013975

(51) Int. Cl.
*H04L 12/28* (2006.01)
*H04L 12/56* (2006.01)
(52) U.S. Cl. .................................... 370/395.1
(58) Field of Classification Search .............. 370/310.1, 370/395.1, 395.6, 395.64
See application file for complete search history.

(56) References Cited

U.S. PATENT DOCUMENTS

| 6,717,948 | B1 * | 4/2004 | Subbiah ................. 370/395.64 |
| 6,741,585 | B1 * | 5/2004 | Munoz et al. ............... 370/352 |
| 6,760,336 | B1 | 7/2004 | Mangin et al. |
| 6,891,833 | B1 * | 5/2005 | Caves et al. ............. 370/395.2 |
| 7,116,658 | B1 * | 10/2006 | Almalki ...................... 370/356 |
| 2002/0089991 | A1 * | 7/2002 | Choi ..................... 370/395.64 |
| 2002/0176360 | A1 * | 11/2002 | Racz et al. .................. 370/230 |
| 2002/0181470 | A1 | 12/2002 | Agnevik et al. |
| 2003/0152108 | A1 * | 8/2003 | Lee ............................ 370/474 |
| 2004/0081168 | A1 * | 4/2004 | Malomsoky et al. ... 370/395.43 |

OTHER PUBLICATIONS

International Telecommunication Union, *"Series Q:Switching and Signalling Broadband ISDN—Common Aspects of B-ISDN Application Protocols for Access Signalling and Network Signalling and Interworking"* AAL type 2 signalling protocol-Capability set 1, Q.2630.1, Dec. 1999, pp. 1-83.

International Telecommunication Union, *"Series Q:Switching and Signalling Broadband ISDN—Common Aspects of B-ISDN Application Protocols for Access Signalling and Network Signalling and Interworking"* AAL type 2 signalling protocol-Capability set 1, Annex B: SDL definition of the AAL type 2 signalling protocol CS-1, Q.2630.1 Annex B, Mar. 2001, pp. 1-63.

(Continued)

*Primary Examiner*—Chirag G Shah
*Assistant Examiner*—Minh-Trang Nguyen
(74) *Attorney, Agent, or Firm*—Alston & Bird LLP

(57) ABSTRACT

Described is a method of providing an AAL2 end-to-end connection in an ATM transmission network using a first and a second AAL2 endpoint and at least an AAL2 switch. The method comprises the step of establishing an end-to-end connection on a concatenation of a first path between the first AAL2 endpoint and the at least one AAL2 switch with a second path between the at least one AAL2 switch and the second AAL2 endpoint. The selection of the first and second path is performed by using a mapping scheme which is valid at least between the first AAL2 endpoint and the at least one AAL2 switch and between the at least one AAL2 switch and the second AAL2 endpoint. The mapping scheme is configured so as to ensure that the first AAL2 endpoint can control the selection of certain paths.

19 Claims, 6 Drawing Sheets

OTHER PUBLICATIONS

International Telecommunication Union, "*Series Q:Switching and Signalling Broadband ISDN—Common Aspects of B-ISDN Application Protocols for Access Signalling and Network Signalling and Interworking*" AAL type 2 signalling protocol-Capability set 2, Q.2630.2, Dec. 2000, pp. 1-78.

International Telecommunication Union, "*Series Q:Switching and Signalling Broadband ISDN—Common Aspects of B-ISDN Application Protocols for Access Signalling and Network Signalling and Interworking*" AAL type 2 signalling protocol-Capability set 3, Q.2630.3, Oct. 2003, pp. 1-153.

* cited by examiner

Alternative mapping table

Originating AAL2 Service Endpoint Address (OA2EA)
+ QoS Codepoint
<> Outgoing Path Identifier

Fig. 5

END-TO END CONNECTIONS IN A SWITCHED NETWORK

FIELD OF THE INVENTION

The present invention relates to a method and system of providing one or more AAL2 end-to-end connections in an ATM transmission network. The present invention also relates to an AAL2 switch.

RELATED BACKGROUND ART

According to the 3GPP ($3^{rd}$ Generation Partnership Project), any signaling in a transport network which is transport related needs to be AAL2 (asynchronous transfer mode (ATM) adaptation layer type 2) signaling to be 3GPP compliant. That is, a 3GPP compliant network is based on AAL2 switching.

The ITU-T recommendation Q.2630 of the International Telecommunication Union defines an AAL2 path as an ATM VCC (virtual channel connection—consisting of one or more virtual channel links VCL) between two adjacent AAL2 nodes. This ATM VCC can be a SVC (switched virtual circuit), a SPVC (smart/soft permanent virtual circuit) or PVC (permanent virtual circuit). According to this definition, the AAL2 path has only local significance in the interface between two adjacent AAL2 switches. Because of this local significance, there are no guarantees in which way an AAL2 connection traverses through a concatenation of AAL2 paths, i.e. which of the AAL2 paths contribute to the concatenation.

Moreover, the existing definitions of an AAL2 connection and an AAL2 path in the ITU-T Recommendations allow each intermediate AAL2 node, as part of the routing function, to multiplex AAL2 connections of different origins into the same outgoing AAL2 paths.

SUMMARY OF THE INVENTION

According to the present invention, it has been recognized that it would be advantageous if the control over the specific configuration of the concatenation of AAL2 paths forming an AAL2 end-to-end resource for one or more AAL2 connections would be significantly enhanced. For example, this holds true in cases where this concatenation of paths is intended to be restrictively used as an end-to-end resource only for respective specific AAL2 connections. That is, according to the present invention it can be ensured that there is a dedicated transport resource reserved end-to-end through the switched AAL2 network and the originating AAL2 end point has the full control on its use.

According to a first aspect of the present invention, there is provided a method of providing an AAL2 end-to-end connection in an ATM transmission network using a first and a second AAL2 endpoint and at least an AAL2 switch, wherein a plurality of AAL2 paths is at least present between the first AAL2 endpoint and the at least one AAL2 switch or between the at least one AAL2 switch and the second AAL2 endpoint, comprising: establishing an end-to-end connection on a concatenation of a first path between the first AAL2 endpoint and the at least one AAL2 switch with a second path between the at least one AAL2 switch and the second AAL2 endpoint, wherein the use of the first and second path is assigned for traffic of the first AAL2 endpoint which acts as an originating node; and wherein the selection of the first and second path is performed by using a mapping scheme which is valid at least between the first AAL2 endpoint and the at least one AAL2 switch and between the at least one AAL2 switch and the second AAL2 endpoint, the mapping scheme being configured so as to ensure that the first AAL2 endpoint can control the selection of certain paths both between the first AAL2 endpoint and the at least one AAL2 switch and between the at least one AAL2 switch and the second AAL2 endpoint.

This method may be modified so that the ATM transmission network comprises a plurality of AAL2 switches, between each pair of AAL2 switches one AAL2 path or a plurality of AAL2 paths is present with one path per pair contributing to the end-to-end connection so as to be concatenated with the first path and the second path, and paths contributing to the end-to-end connection are also assigned for the traffic of the first AAL2 endpoint which acts as an originating node, and are selected in accordance with the selection of the first and second path.

This method may also be modified so that the ATM transmission network comprises a plurality of second AAL2 endpoints each having a second path concatenated with the first path thus establishing an end-to-end connection per each concatenation of a second path with the first path so that the first path is shared by a plurality of end-to-end connections from the first AAL2 endpoint to respective ones of the plurality of second AAL2 endpoints.

Still, this method may be modified so that the mapping scheme is also configured to ensure that the concatenation of paths is formed by respective single paths having traffic transmission properties which are most similar to each other and thus most appropriate for the needs of the user of the given AAL2 connections, the concatenation of paths thus forming an end-to-end transport resource.

According to a second aspect of the present invention, there is provided a system which provides an AAL2 end-to-end connection in an ATM transmission network comprising a first and a second AAL2 endpoint and at least an AAL2 switch, wherein a plurality of AAL2 paths is at least present between the first AAL2 endpoint and the at least one AAL2 switch, which are thus operably connected, or between the at least one AAL2 switch and the second AAL2 endpoint, which are thus operably connected, wherein the system is configured to establish an end-to-end connection on a concatenation of a first path between the first AAL2 endpoint and the at least one AAL2 switch with a second path between the at least one AAL2 switch and the second AAL2 endpoint, to assign the use of the first and second path for traffic of the first AAL2 endpoint acting as an originating node; and to perform the selection of the first and second path by using a mapping scheme which is valid at least between the first AAL2 endpoint and the at least one AAL2 switch and between the at least one AAL2 switch and the second AAL2 endpoint, the mapping scheme being configured so as to ensure that the first AAL2 endpoint can control the selection of certain paths both between the first AAL2 endpoint and the at least one AAL2 switch and between the at least one AAL2 switch and the second AAL2 endpoint.

This system may be modified so that the ATM transmission network comprises a plurality of AAL2 switches, between each pair of AAL2 switches one AAL2 path or a plurality of AAL2 paths is present, which are thus operably connected with each other, and the configuration of the system includes that one path per pair contributes to the end-to-end connection so as to be concatenated with the first path and the second path, as well as that paths contributing to the end-to-end connection are also assigned for the traffic of the first AAL2 endpoint acting as an originating node, and are selected in accordance with the selection of the first and second path.

This system may also be modified so that the ATM transmission network comprises a plurality of second AAL2 endpoints and the configuration of the system includes that each second AAL2 endpoint has a second path concatenated with the first path thus establishing an end-to-end connection per each concatenation of a second path with the first path so that the first path is shared by a plurality of end-to-end connections from the first AAL2 endpoint to respective ones of the plurality of second AAL2 endpoints.

Still, this system may be modified so that the mapping scheme is also configured to ensure that the concatenation of paths is formed by respective single paths having traffic transmission properties which are most similar to each other and thus most appropriate for the needs of the user of the given AAL2 connections, the concatenation of paths thus forming an end-to-end transport resource.

According to a third aspect of the present invention, there is provided an AAL2 switch configured to be used in an AAL2 end-to-end connection in an ATM transmission network, and operably connected with a first and a second AAL2 endpoint at least by a plurality of AAL2 paths, wherein the switch is configured for establishment of an end-to-end connection on a concatenation of a first path from the first AAL2 endpoint with a second path to the second AAL2 endpoint, for assignment of the use of the first and second path for traffic of the first AAL2 endpoint acting as an originating node; and for performance of selection of the first and second path by using a mapping scheme which is valid at least between the first AAL2 endpoint and the at least one AAL2 switch and between the at least one AAL2 switch and the second AAL2 endpoint, the mapping scheme being configured so as to ensure that the first AAL2 endpoint can control the selection of certain paths both from the first AAL2 endpoint and to the second AAL2 endpoint.

This AAL2 switch may be modified so that it is further operably connected to another AAL2 switch at least by one AAL2 path or a plurality of AAL2 paths, wherein the switch is further configured for concatenation of a third AAL2 path to or from the another switch with the concatenation of paths according to the mapping scheme, and for assignment of the third path for the traffic of the first AAL2 endpoint acting as an originating node.

This AAL2 switch may also be modified so as to be operably connected with a plurality of second AAL2 endpoints at least by respective AAL2 paths, wherein the switch is further configured for establishment of an end-to-end connection on each concatenation of a respective second path to a second AAL2 endpoint with the first path, and for sharing of the first path among a plurality of end-to-end connections from the first AAL2 endpoint.

Still, the AAL2 switch may also be modified so that the mapping scheme is also configured to ensure that the concatenation of paths is formed by respective single paths having traffic transmission properties which are most similar to each other and thus most appropriate for the needs of the user of the given AAL2 connections, the concatenation of paths thus forming an end-to-end transport resource.

In any of the above aspects of the present invention, the mapping scheme may include that a certain value in a quality of service indication field is linked with a certain outgoing path identifier, that a certain value in a quality of service indication field in connection with a certain incoming path identifier is linked with a certain outgoing path identifier, that a certain incoming path identifier is linked with a certain outgoing path identifier, or that an originating AAL2 service endpoint address in connection with a certain value in a quality of service indication field is linked with a certain outgoing path identifier.

The present invention also includes a computer program product comprising processor implementable instruction portions for performing all the steps of a method as defined above. The computer program product may comprise a software medium storing said processor implementable instruction portions, and the computer program product may be directly loadable into the internal memory of a computer.

Further included in the present invention is a signal carrying processor implementable instructions for controlling a computer to carry out all the steps of a method as defined above.

Therefore, according to the present invention, it is possible to use a concatenation of paths as an end-to-end resource only for specific AAL2 connections.

This means that it is possible to ensure that there is a dedicated transport resource reserved end-to-end through the switched AAL2 network so that the originating AAL2 end point has the full control on its use. This removes a recognized disadvantage of the prior art where the existing definitions of AAL2 connection and AAL2 Path in the ITU-T Recommendations do not ensure this full control but instead each intermediate AAL2 node is allowed, as part of the routing function, to multiplex AAL2 connections of different origins into the same outgoing AAL2 paths.

Moreover, the originating end point is enabled to establish individual AAL2 connections so that these connections become assigned to a given transport resource end-to-end through the switched AAL2 network. In AAL2 network environment this transport resource corresponds to a specific concatenation of AAL2 Paths.

BRIEF DESCRIPTION OF THE DRAWINGS

Further advantages, modifications and details will be apparent from the following description of the preferred embodiments of the present invention which are to be taken in conjunction with the accompanying drawings, in which:

FIG. 5 shows another modification of the mapping table as a still further embodiment of the present invention.

DETAILED DESCRIPTION OF THE PREFERRED EMBODIMENTS

Figure 1:
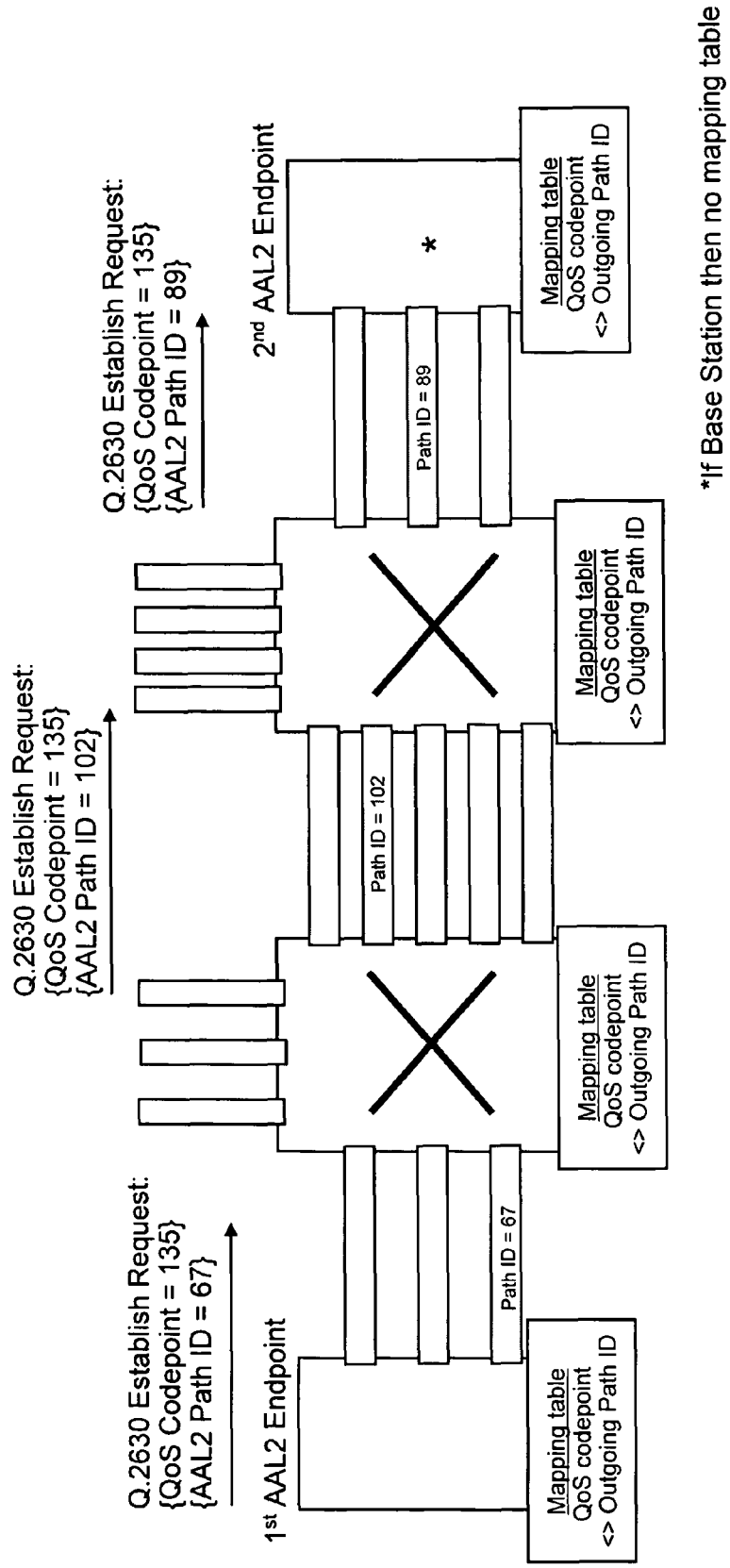
FIG. 1 shows a network situation implementing a preferred embodiment of the present invention.

According to an embodiment of the present invention, a standard based mechanism to create an end-to-end AAL2 path with dedicated resources in a switched AAL2 network between two AAL2 service end points is described.

The ITU-T recommendation Q.2630 of the International Telecommunication Union defines an AAL2 path as follows: "... an ATM VCC between two adjacent AAL type 2 nodes. This ATM VCC can either be an SVC, SPVC, or PVC." According to this definition, the AAL2 path has only local significance in the interface between two adjacent AAL2 switches. Because of this local significance, there are no guarantees that any specific AAL2 connection would traverse through a specific concatenation of AAL2 paths.

It is remarked here that usage of the ITU-T Q.2630 protocol is only an implementation example for carrying out the present invention so as to be one option of the preferred embodiments described. However, usage of the ITU-T Q.2630 protocol is not intended to be limiting the present invention in any way.

The mechanism according to an embodiment of the present invention relies on the network specific use of the so-called AAL2 path QoS codepoint (Quality of Service). This codepoint is introduced in the ITU-T recommendation Q.2630 version 2 (Q.2630.2), also known as Capability Set 2. The AAL2 path QoS codepoint is signalled in a "AAL2 Establish Request" message that is used for setting up an AAL2 connection. The codepoint was originally defined to indicate the QoS of the AAL2 path that is required for the given AAL2 connection. The QoS codepoint is an 8-bit field allowing 256 different codepoint values. The value range 6-127 has been reserved for assignment by ITU-T and thus their proprietary use cannot be encouraged. Within that range, the values 1, 2 and 5 have been assigned for specific QoS classes (Q.2630.2 recommendation, chapter 7.4.21). However, the value range 128-255 is reserved for network specific assignment.

According to an embodiment of the present invention, this network specific value range of the QoS codepoint is used to identify an end-to-end AAL2 resource instance throughout an entire AAL2 network, i.e. end-to-end. This end-to-end AAL2 resource instance is implemented as a concatenation of AAL2 paths that share similar QoS characteristics and potentially also similar bandwidth. The characteristics for the AAL2 resource instance is, that it is allowed to be used only by those AAL2 connections that have been assigned to it in the AAL2 connection setup. This assignment is done by utilizing the network specific range of the QoS codepoint in the "AAL2 Establish Request" message. It is to be noted that this network specific use is not against the idea behind the QoS codepoint (i.e. to associate an AAL2 connection to a path with a certain QoS). The difference is only that the network specific value range allows a strict control of the use (assignment) of any given AAL2 path in the network.

In a generic AAL2 switch there is a mapping arrangement between the AAL2 QoS codepoint values and AAL2 paths corresponding to the given QoS codepoint (stringent, tolerant, stringent bi-level). This mapping arrangement can be implemented as a mapping table in the switch. Any given AAL2 path is identified by its Path ID according to the ITU-T recommendation Q.2630, chapter 7.4.3: "It identifies unambiguously an AAL type 2 path between a pair of adjacent AAL type 2 nodes".

According to an embodiment of the present invention, the role of this mapping arrangement is extended to map not only to any AAL2 path with the indicated QoS characteristics (stringent, tolerant, stringent bi-level), as is the case with prior art, but to a specific path with certain QoS characteristics.

The following first embodiment of the present invention illustrates an implementation of the present invention by referring to FIG. 1, wherein it is shown that the mapping tables in the involved AAL2 nodes establish an end-to-end resource by defining the mapping between a Quality of Service code point in the incoming ERQ (ERQ=Establish Request) and the specific outgoing AAL2 path.

Depicted is an example network with two AAL2 switches according to the first embodiment of the present invention. Between the first AAL2 end point and the first AAL2 switch there are three AAL2 paths. Between the first AAL2 switch and the second AAL2 switch there are five AAL2 paths. Between the second AAL2 switch and the second AAL2 end point there are again three different AAL2 paths. One of the three paths originating from the first AAL2 end point belongs to an end-to-end AAL2 resource instance. The other endpoint of this given instance is in the second AAL2 end point. It is emphasized that the number of end-to-end resource instances per an interface can be higher than one.

In FIG. 1 the QoS codepoint 135 is a pointer to an AAL2 path with a path ID of 67 in the interface between the first end system and the first switch. The same QoS codepoint of 135 is a pointer to an AAL2 path with a path ID of 102 between the two switches. In the interface between the $2^{nd}$ AAL2 switch and the $2^{nd}$ end system the given QoS codepoint maps to a path with a path ID of 89.

In FIG. 1, the corresponding contents of the "AAL2 Connection Establishment" message (ERQ) are also illustrated. Based on the mapping configuration, the originating AAL2 node selects the intended path ID as part of its connection element identifier (CEI). The other part of the CEI, namely the channel identifier (CID), is not part of the mapping configuration, but it can be selected freely from the available CIDs.

By using the QoS codepoint as the pointer in the AAL2 path selection, the present embodiment of the invention takes benefit of the available mapping logic in the AAL2 node, which is present for a so-called "Path Selection" feature which is one of the features according to the ITU-T recommendation Q.2630 CS-2. The use of the network specific range of the QoS codepoint also simplifies the mapping table entries, since the QoS codepoint has network wide significance.

An implementation example of the present invention according to its first embodiment is based on the existence of an extended mapping table in all involved network elements. It is noted that a mapping between a QoS codepoint and an AAL2 path is anyway needed in order to utilize the path selection feature of the ITU-T recommendation Q.2630 CS-2 (and later version). Thus, there is the advantage that the present embodiment would be easy to implement in any CS-2 capable AAL2 node.

Figure 2:
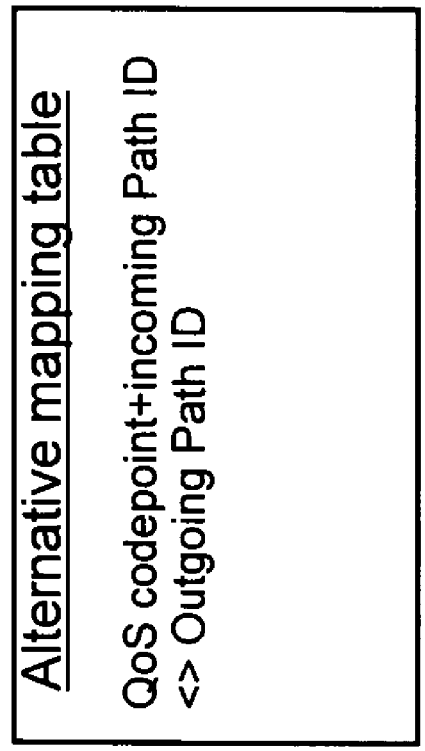
FIG. 2 shows a modification of the mapping table according to FIG. 1 as another preferred embodiment of the present invention.

In FIG. 2, an alternative mapping table is illustrated so as to form a modification of the embodiment shown in FIG. 1. This modification according to a second embodiment of the present invention allows a higher number of AAL2 resource instances in the network. FIG. 2 shows a situation where there is not only a mapping rule between the incoming Quality of Service code point and the specific outgoing AAL2 path, but also the incoming Path Identity (Path ID) needs to match with the mapping rule in order to allow access to the specific outgoing AAL2 path.

In detail, a mapping is not only implemented between a QoS codepoint and an outgoing Path ID, but between a QoS codepoint plus the incoming Path ID and the outgoing Path ID. This allows a better scalability, that is, a significantly higher number of different end-to-end resource instances, in case of big AAL2 networks, since the mapping table entry is thus specific to both the QoS codepoint and the incoming path ID, instead of just the QoS codepoint.

Figure 3:
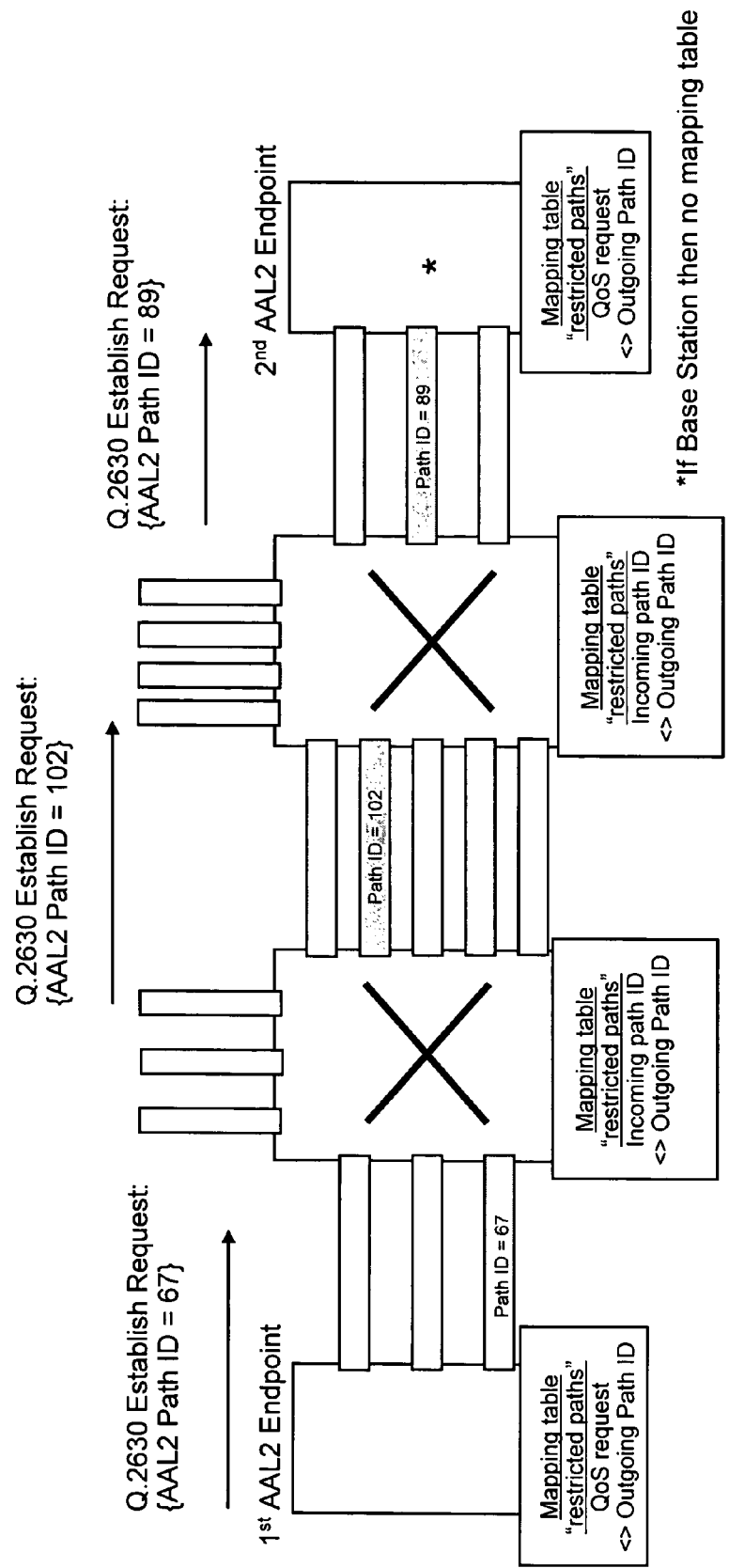
FIG. 3 shows a network situation implementing the present invention differently as still another preferred embodiment thereof.

In FIG. 3, a simple alternative is shown of making the end-to-end AAL2 resource instance available as a third embodiment of the present invention.

This embodiment is based on defining a set of restricted AAL2 paths in the involved AAL2 nodes. The access to dedicated paths is solely based on path ID information. This embodiment can be seen as an AAL2 PVC approach, though still allowing the multiplexing of several AAL2 connections into each of the restricted AAL2 Paths.

The present embodiment is based on the configuration of a chain of AAL2 paths as a semipermanent end-to-end connection. In the present embodiment, the QoS codepoint is not used at all, but it is the task of the 1$^{st}$ end system to select the corresponding AAL2 path ID in the ERQ, if it wishes to use the given semipermanent end-to-end connection. The benefit of this alternative is that it enables the use of the end-to-end AAL2 resource instance also in networks which are "only" compliant to the ITU-T recommendation Q.2630 version 1 (Q.2630.1), i.e. a QoS codepoint is not supported. The arrangement as in FIG. 3 can be seen as an AAL2 PVC approach that still allows the sharing of the permanent virtual channel (concatenation of AAL2 Paths) by several AAL2 connections.

However, an advantage of the use of the network specific QoS codepoint values is that they allow the use of the present invention in any generic AAL2 network as the codepoint values are—by their definition—specific to a certain network.

Figure 4:
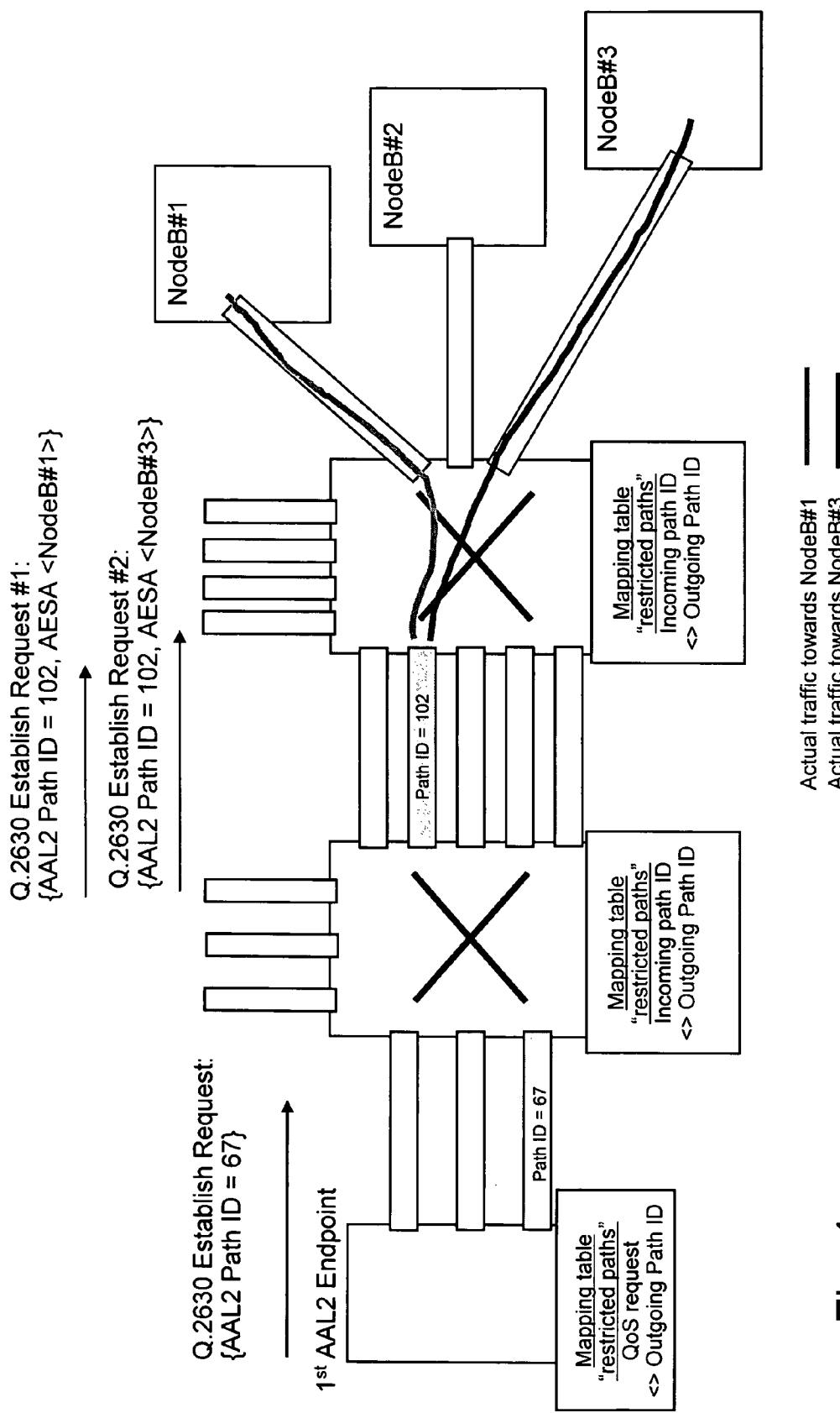
FIG. 4 shows a network situation implementing the present invention as a further preferred embodiment thereof.

In FIG. 4, a fourth embodiment is depicted to illustrate the possibility to have several AAL2 connections all using the same end-to-end resource while still having different destination end points. In the second AAL2 switch the routing function determines from the destination AAL2 end point addresses that the two connections have different end points. Stated in other words, there are two AAL2 connections of the same origin sharing the end-to-end controlled resource, but still having different destinations. The ability to use the controlled resource by connections of different destinations is another benefit of the present invention. It is remarked that the present embodiment illustrating such a one to many end-to-end resource reservation can be combined with any mapping scheme disclosed herein.

One particular example for this embodiment would be that a radio network controller (RNC) of a wideband code division multiple access radio access network (WCDMA RAN) represents the originating AAL2 endpoint, while a plurality of node B would represent different destination endpoints.

In FIG. 5 another embodiment of the invention is explained. There, the mapping is between the originating AAL2 end system address plus QoS code point and the outgoing path identifier. This arrangement allows better scalability of the end-to-end resource usage as it is now per an originating AAL2 end system. It is noted that this embodiment requires the use of Q.2630 Capability Set 3 (Q.2630.3) as the originating AAL2 end system address is not included in the "Establish Request" of earlier Capability Sets.

Figure 6:
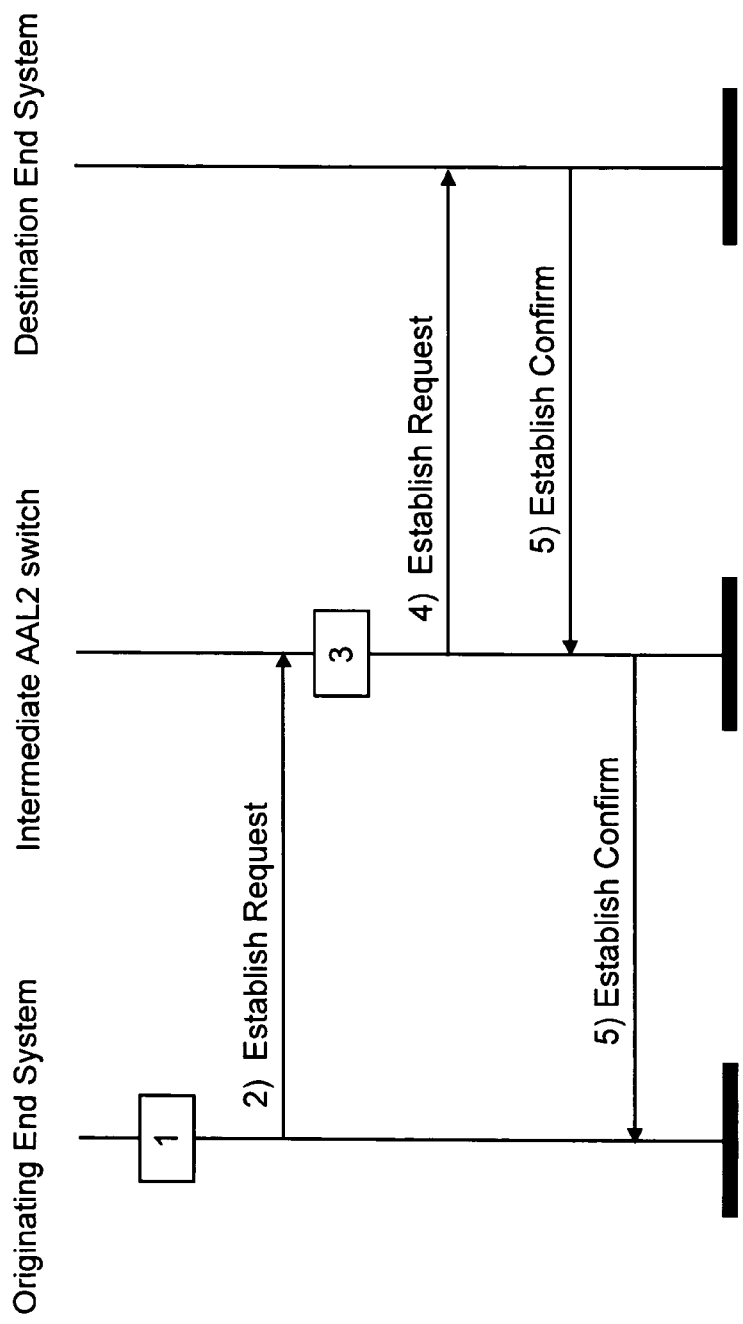
FIG. 6 shows a signaling diagram according to a preferred embodiment of the present invention.

FIG. 6 shows the signaling diagram of a preferred embodiment of the present invention. In detail, the signaling between an originating end system, an intermediate AAL2 switch and a destination end system is shown. Examples for these elements have been depicted in the preceding figures.

In the signaling, at first (step 1) there is a connection request from the application, including at least the destination service endpoint address and QoS characteristics, if any. The information in the connection request is then analyzed to determine if a dedicated path is to be used. The analysis depends on the embodiment of the invention in use.

Next (step 2) there is a connection request message built according to the rules of the connection control protocol in question (wherein protocol ITU-T Q.2630 is assumed as an implementation example) and the message is sent to the intermediate AAL2 switch.

In a third step, information in the received connection request message is analyzed to determine if any specific mapping rules are to be used for the assignment of the outgoing AAL2 path.

Thereafter (step 4) a connection request message (which according to Q.2630 is the Establish Request message) is built according to the protocol rules and sent to the next AAL2 node. It is to be noted that if there are additional intermediate AAL2 nodes involved, then steps 3 and 4 are repeated by each of the nodes consecutively.

Finally, in a fifth step the destination end system acknowledges a successful connection establishment by sending an acknowledgment back to the originating end system according to the rules of the connection control protocol in question (wherein protocol ITU-T Q.2630 is assumed as an implementation example).

In all of the above described embodiments the Path IDs in the mapping tables can be configured to represent paths with restricted access. It is part of the CAC (connection admission control) procedure of the AAL2 node to check that the connection under establishment has the access rights to the given outgoing path. If the access is restricted, then only those AAL2 connections shall have access to the given path which have the corresponding "mapping pointer" such as a QoS codepoint in their incoming connection establishment message (e.g. "Establish Request" message). For example, in case that the mapping is only based on an incoming Path ID, the access control of the outgoing path is based on the incoming Path ID. This means that, on a more general level regarding the above embodiments, the dedicated paths can have certain access restrictions in the system.

A further advantage of the present invention is that it does not require any changes in the ITU-T defined AAL2 connection control protocol, while still providing a new and useful capability for the AAL2 network user.

A further advantage of the present invention is that while it is based on the notion of an end-to-end controlled resource, this resource can still be shared by several individual AAL2 connections. These AAL2 connections can even have different destination end points.

Still another advantage is that certain embodiments of the present invention are relying on the standard mapping between a received QoS codepoint parameter and an outgoing AAL2 path, thus minimizing the need for a new implementation in an AAL2 switching node. The impact on the existing AAL2 switch implementation depends on the applied embodiment of the invention.

Accordingly, what is described above is a method of providing an AAL2 end-to-end connection in an ATM transmission network using a first and a second AAL2 endpoint and at least an AAL2 switch, wherein respective pluralities of AAL2 paths are present between the first AAL2 endpoint and the at least one AAL2 switch and between the at least one AAL2 switch and the second AAL2 endpoint, comprising: establishing an end-to-end connection on a concatenation of a first path between the first AAL2 endpoint and the at least one AAL2 switch with a second path between the at least one AAL2 switch and the second AAL2 endpoint, wherein the use of the first and second path is assigned for traffic of the first AAL2 endpoint which acts as an originating node; and wherein the selection of the first and second path is performed by using a mapping scheme which is valid at least between the first AAL2 endpoint and the at least one AAL2 switch and between the at least one AAL2 switch and the second AAL2 endpoint, the mapping scheme being configured so as to ensure that the first AAL2 endpoint can control the selection of certain paths both between the first AAL2 endpoint and the at least one AAL2 switch and between the at least one AAL2 switch and the second AAL2 endpoint.

Although it has been described above what is presently considered to be preferred embodiments of the present invention, it is fully apparent to those who are skilled in the art that various modifications of and combinations among the above described preferred embodiments are possible unless otherwise implied without deviating from the spirit and scope of the present invention as defined by the appended claims.

The invention claimed is:

1. A method, comprising:
    directing reading out of a request for establishing an end-to-end connection in an asynchronous transfer mode transmission network, wherein the request comprises a pointer corresponding to a quality of service desired for the end-to-end connection and the pointer corresponding to a specific end-to-end resource instance, wherein the specific end-to-end resource instance is assigned to an end-to-end connection via the request by utilizing a network specific range of a quality of service codepoint to allow control of a given asynchronous transfer mode adaptation layer 2 path within the asynchronous transfer mode transmission network;
    mapping the pointer, using a mapping arrangement, to a specific outgoing asynchronous transfer mode adaptation layer 2 path, wherein the specific outgoing asynchronous transfer mode adaptation layer 2 path comprises a certain quality of service characteristic corresponding to the desired quality of service; and
    directing establishment of the requested end-to-end connection on the specific outgoing asynchronous transfer mode adaptation layer 2 path.

2. The method according to claim 1, further comprising:
    concatenating an incoming asynchronous transfer mode adaptation layer 2 path comprising the certain quality of service characteristic corresponding to the desired quality of service with the outgoing asynchronous transfer mode adaptation layer 2 path; and
    directing establishment of the requested end-to-end connection on the concatenation of the incoming asynchronous transfer mode adaptation layer 2 path and the outgoing asynchronous transfer mode adaptation layer 2 path.

3. The method according to claim 1, further comprising:
    sharing the outgoing asynchronous transfer mode adaptation layer 2 path among the requested end-to-end connection as a first requested connection and a second requested connection comprising a pointer corresponding to a quality of service desired for the second requested connection,
    wherein the quality of service desired for the second requested connection corresponds to the quality of service desired for the first requested connection.

4. The method according to claim 1, further comprising:
    mapping a value in a quality of service indication field with an outgoing path identifier.

5. The method according to claim 1, further comprising:
    mapping a value in a quality of service indication field in connection with an incoming path identifier and an outgoing path identifier.

6. The method according to claim 1, further comprising:
    mapping an incoming path identifier with an outgoing path identifier, 7. The method according to claim 1, further comprising:
    mapping an originating asynchronous transfer mode adaptation layer 2 service endpoint address in connection with a value in a quality of service indication field and an outgoing path identifier.

8. A system, comprising:
    a plurality of asynchronous transfer mode adaptation layer 2 switches, wherein each of said plurality of asynchronous transfer mode adaptation layer 2 switches is configured to:
        direct read out of a request to establish an end-to-end connection in an asynchronous transfer mode transmission network, wherein the request comprises a pointer corresponding to a quality of service desired for the end-to-end connection and the pointer corresponding to a specific end-to-end resource instance, wherein the specific end-to-end resource instance is assigned to an end-to-end connection via the request by utilizing a network specific range of a quality of service codepoint to allow control of a given asynchronous transfer mode adaptation layer 2 path within the asynchronous transfer mode transmission network;
        refer to a mapping arrangement included in the asynchronous transfer mode adaptation layer 2 switch, wherein the mapping arrangement is configured to map the pointer to a specific outgoing asynchronous transfer mode adaptation layer 2 path comprising a certain quality of service characteristic corresponding to the desired quality of service; and
        direct establishment of the requested end-to-end connection on the specific outgoing asynchronous transfer mode adaptation layer 2 path.

9. An apparatus comprising at least one processor and at least one memory including computer program code, the at least one memory and the computer program code configured to, with the at least one processor, cause the apparatus at least to:
    direct read out of a request to establish an end-to-end connection in an asynchronous transfer mode transmission network, wherein the request comprises a pointer corresponding to a quality of service desired for the end-to-end connection and the pointer corresponding to a specific end-to-end resource instance, wherein the specific end-to-end resource instance is assigned to an end-to-end connection via the request by utilizing a network specific range of a quality of service codepoint to allow control of a given asynchronous transfer mode adaptation layer 2 path within the asynchronous transfer mode transmission network;
    refer to a mapping arrangement included in the apparatus, wherein the mapping arrangement is configured to map the pointer to a specific outgoing asynchronous transfer mode adaptation layer 2 path comprising a certain quality of service characteristic corresponding to the desired quality of service; and
    direct establishment of the requested end-to-end connection on the specific outgoing asynchronous transfer mode adaptation layer 2 path.

10. The apparatus according to claim 9, wherein the apparatus is further caused to:
    concatenate an incoming asynchronous transfer mode adaptation layer 2 path comprising the certain quality of service characteristic corresponding to the desired quality of service with the outgoing asynchronous transfer mode adaptation layer 2 path; and
    direct establishment of the requested end-to-end connection on the concatenation of the incoming asynchronous transfer mode adaptation layer 2 path and the outgoing asynchronous transfer mode adaptation layer 2 path.

11. The apparatus according to claim 9, wherein the apparatus is further caused to share the outgoing asynchronous transfer mode adaptation layer 2 path among the requested end-to-end connection as a first requested connection and a second requested connection comprising a pointer corresponding to a quality of service desired for the second requested connection, and wherein the quality of service desired for the second requested connection corresponds to the quality of service desired for the first requested connection.

12. The apparatus according to claim 9, wherein the mapping arrangement is further configured to map a value in a quality of service indication field with an outgoing path identifier.

13. The apparatus according to claim 9, wherein the mapping arrangement is further configured to map a value in a quality of service indication field in connection with an incoming path identifier and an outgoing path identifier.

14. The apparatus according to claim 9, wherein the mapping arrangement is further configured to map an incoming path identifier with an outgoing path identifier.

15. The apparatus according to claim 9, wherein the mapping arrangement is further configured to map an originating asynchronous transfer mode adaptation layer 2 service endpoint address in connection with a value in a quality of service indication field and an outgoing path identifier.

16. A computer program product embodied on a non-transitory computer readable medium, the computer program product being configured to control a processor to perform a method, the method comprising:
  directing reading out of a request for establishing an end-to-end connection in an asynchronous transfer mode transmission network, wherein the request comprises a pointer corresponding to a quality of service desired for the end-to-end connection and the pointer corresponding to a specific end-to-end resource instance, wherein the specific end-to-end resource instance is assigned to an end-to-end connection via the request by utilizing a network specific range of a quality of service codepoint to allow control of a given asynchronous transfer mode adaptation layer 2 path within the asynchronous transfer mode transmission network;
  mapping, using a mapping arrangement, the pointer to a specific outgoing asynchronous transfer mode adaptation layer 2 path comprising a certain quality of service characteristic corresponding to the desired quality of service; and
  directing establishment of the requested end-to-end connection on the specific outgoing asynchronous transfer mode adaptation layer 2 path.

17. The computer program product according to claim 16, wherein said computer program product comprises a software medium configured to store processor implementable instruction portions.

18. The computer program product according to claim 16, wherein said computer program product is directly loadable into an internal memory of a computer.

19. An apparatus, comprising:
  means for directing reading out of a request to establish an end-to-end connection in an asynchronous transfer mode transmission network, wherein the request comprises a pointer corresponding to a quality of service desired for the end-to-end connection and the pointer corresponding to a specific end-to-end resource instance, wherein the specific end-to-end resource instance is assigned to an end-to-end connection via the request by utilizing a network specific range of a quality of service codepoint to allow control of a given asynchronous transfer mode adaptation layer 2 path within the asynchronous transfer mode transmission network;
  mapping means for mapping the pointer to a specific outgoing asynchronous transfer mode adaptation layer 2 path comprising a certain quality of service characteristic corresponding to the desired quality of service; and
  connecting means for directing establishment of the requested end-to-end connection on the specific outgoing asynchronous transfer mode adaptation layer 2 path.

* * * * *